(12) United States Patent
Verbrugge et al.

(10) Patent No.: US 8,440,350 B1
(45) Date of Patent: May 14, 2013

(54) LITHIUM-ION BATTERY ELECTRODES WITH SHAPE-MEMORY-ALLOY CURRENT COLLECTING SUBSTRATES

(75) Inventors: Mark W. Verbrugge, Troy, MI (US); Xingcheng Xiao, Troy, MI (US); Anil K. Sachdev, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 7 days.

(21) Appl. No.: 13/293,165

(22) Filed: Nov. 10, 2011

(51) Int. Cl.
*H01M 4/02* (2006.01)
(52) U.S. Cl.
USPC .......................................................... 429/209
(58) Field of Classification Search ........................ None
See application file for complete search history.

(56) References Cited

U.S. PATENT DOCUMENTS

| | | | |
|---|---|---|---|
| 2008/0254330 A1* | 10/2008 | Jones et al. | 429/23 |
| 2008/0254343 A1* | 10/2008 | Kaplin et al. | 429/53 |
| 2009/0130543 A1* | 5/2009 | Tatebayashi et al. | 429/62 |
| 2010/0239897 A1* | 9/2010 | Sumihara et al. | 429/94 |

OTHER PUBLICATIONS

Riccardo Ruffo; Impedance Analysis of Silicon Nanowire Lithium Ion Battery Anodes; J. Phys. Chem. C 2009, 113, pp. 11390-11398.

* cited by examiner

*Primary Examiner* — Patrick Ryan
*Assistant Examiner* — Wyatt McConnell
(74) *Attorney, Agent, or Firm* — Reising Ethington P.C.

(57) ABSTRACT

Lithium-ion battery electrode constructions use an array of nanowires (or of other long thin shapes) of active electrode material anchored at one end to a surface of a metal current collector sheet in an electrode assembly or construction. This form of active electrode material permits good contact with a liquid lithium-ion containing electrolyte that infiltrates the closely-spaced thin shapes. Stresses arising from volume changes in the long shapes with lithiation and de-lithiation of the active material is mitigated by strategic placement of shape memory apply forms between attachment surfaces of the active electrode material and other members of the electrode assembly.

18 Claims, 6 Drawing Sheets

LITHIUM-ION BATTERY ELECTRODES WITH SHAPE-MEMORY-ALLOY CURRENT COLLECTING SUBSTRATES

TECHNICAL FIELD

This invention pertains to electrode materials and structures for the cells of lithium-ion batteries in which lithium atoms are repeatedly inserted into and removed from small, wire-like shapes of negative electrode active material during charging and discharging of the battery. More specifically, this invention pertains to the formation of such shapes of electrode materials, anchored in an elastic shape memory alloy substrate, to enable longer and more effective cycling of such electrode materials.

BACKGROUND OF THE INVENTION

Lithium-ion batteries are used as electric storage systems for powering electric and hybrid electric vehicles. These batteries comprise a plurality of suitably interconnected electrochemical cells arranged to provide a predetermined electrical current at a specified electrical potential. In each such cell, lithium is transported as lithium ions from a negative electrode through a non-aqueous, lithium-containing, electrolyte solution to a lithium ion-accepting positive electrode as an electronic current is delivered from the battery to an external load, such as an electric traction motor. A suitable porous separator material, infiltrated with the electrolyte solution and permeable to the transport of lithium ions in the electrolyte, is employed to prevent short-circuiting physical contact between the electrodes. Graphite has been used as a negative electrode material and bonded in a thin electrode layer on a copper current collector. During charging of the cells, lithium is inserted into the graphite (lithiation, forming $LiC_6$, about 372 mAh/g) and extracted from the graphitic carbon during discharging (de-lithiation). A suitable particulate material for receiving and storing inserted lithium during discharge of each cell is used as the positive electrode material. Examples of such positive electrode materials include lithium cobalt oxide ($LiCoO_2$), a spinel lithium transition metal oxide such as spinel lithium manganese oxide ($LiMn_xO_y$), a lithium polyanion such as a nickel-manganese-cobalt oxide [$Li(N-i_xMn_yCo_z)O_2$], lithium iron phosphate ($LiFePO_4$), or lithium fluorophosphate ($Li_2FePO_4F$), or a mixture of any of these materials. Suitable positive electrode materials are often bonded as a thin layer to an aluminum current collector. The electrochemical potential of such lithium ion cells is typically in the range of about 2 to 4.5 volts.

The use of lithium-ion batteries to power electric motors in automotive vehicles has led to the need for higher gravimetric and/or volumetric capacity batteries. While graphitic carbon is a durable and useful lithium-intercalating, negative electrode material for lithium-ion cells, it has a relatively low capacity for such lithium insertion. Other potential negative electrode materials such as silicon (theoretical capacity, 3578 mAh/g for $Li_{15}Si_4$) and tin (theoretical capacity, 994 mAh/g for $Li_{22}Sn_5$) have much higher theoretical capacities than graphite for lithium insertion. However, the volume change of up to 300 volume percent for silicon during lithiation and de-lithiation processes leads to fracture of the active silicon material and/or loss of electrical contact with the conductive additives or the current collectors. And tin has the same problem of a large volume expansion upon lithiation, leading to rapid capacity degradation.

The basic mechanism responsible for the loss of capacity of a battery due to fracture of the electrode materials in its cells is the loss of electrical contact with conductive material and the creation of new surfaces, which irreversibly consume the active lithium to form new solid electrolyte interfaces. Both problems shorten the effective cycling capacity of a battery. There remains a need for a more effective way or material form of utilizing silicon or tin in negative electrodes of lithium-ion cells.

SUMMARY OF THE INVENTION

This invention pertains to lithium-ion electrochemical cells that use electrode materials with relatively high capacities for inserting and de-inserting lithium in repeated cycling of the cell. While embodiments of the invention may be used advantageously with electrode materials in general, the invention is particularly useful with respect to materials for negative electrodes of lithium-ion cells.

In lithium-ion electrochemical cells, negative electrode materials typically experience significant volume change as lithium is absorbed or released. In accordance with embodiments of the invention, such electrode materials are used in the form of nanowires or in other relatively long, thin (nanometer size thicknesses) shapes for providing abundant surface area for contact with a liquid lithium-ion containing electrolyte. The nanowires or thin shapes may have a diameter or cross-section thickness of, for example, 2 nm to 200 nm and a length (or height) of five to fifty micrometers. Ends of the nanowires or long, thin shapes of electrode material are in contact with a metal current collector for conduction of electrons from and to the active material. In further accordance with embodiments of the invention, structural members of a suitable super-elastic shape memory alloy are placed or formed so as to mitigate stress in the long members of active material, particularly in portions of the members where they are fixed to a current collector. The shape memory alloy members of the negative electrode construction are, thus, shaped and placed to release the stress of volume changes in the electrode material as it is repeatedly lithiated and de-lithiated in the cycling of the electrochemical cell.

Suitable negative electrode materials include silicon or tin, and may even include carbon (graphite) or other lithium-accepting material when used in wire-like or other long, thin shapes. When the active negative electrode material is in the form of nanowires, one end of each wire-shape may be attached to a negative electrode current collector through a super-elastic shape memory alloy base member. Each wire-end and SMA interfacial base member may, for example, be fixed to (or in) a surface of a copper current collector. In this embodiment, many closely spaced nanowires of active material extend side-by-side from their SMA attachment members and the surface of the copper current collector. A representative negative electrode may have, for example, a million to a trillion upstanding wires or wire shapes per square millimeter of current collector surface. In an assembled lithium-ion battery, many interconnected cells containing these wire shapes of negative electrode active material are infiltrated with a non-aqueous liquid solution of a lithium ion containing electrolyte. And in each cell a suitable electrolyte permeable separator material isolates the negative electrode material from complementary positive electrolyte material. Such closely spaced wires, with nanometer-size diameters, may have lengths of, for example, up to fifty or one hundred micrometers. The nanowires provide abundant surface areas for absorbing lithium ions from the electrolyte and releasing lithium ions to the electrolyte, with concurrent flow of electrons, during charging and discharging of the lithium-ion battery.

In other embodiments of the invention a SMA material may be used as the current collector and nanowires of active material may be formed with their ends attached to the SMA surface, or with the ends of the active material nanowires anchored in shallow cavities in the SMA current collector surface. Again, the nanowires may have lengths of up to fifty to one hundred nanometers.

In still other embodiments of the invention, SMA material may be deposited on a metal current collector as a base layer having many upstanding nanometer-diameter posts for confining a continuous porous body of particles (bonded or unbonded) of active electrode material adjacent the collector surface and surrounding the regularly spaced posts. The posts of SMA would be placed to form many wire-like sections in the continuous phase of active material, with the SMA posts and surrounding active material extending fifty to one hundred micrometers from the surface of the current collector. In still another embodiment of the invention, a like base layer of SMA with nanometer posts is formed and a continuous nanometer-thick coating of active electrode material is applied over and between the posts and against the SMA base layer. Again, the generally continuous film of active material has nanometer size thicknesses but with wall lengths overlying the posts that extend for many micrometers.

Such electrode material forms, whether of wire-shapes or other long, thin shapes, with both nanometer and micrometer dimensions, expand as lithium atoms enter the long thin shapes (lithiation) during cell charging and shrink as lithium leaves the wire shapes (as lithium ions, de-lithiation) during cell discharge. While much of the lengthy regions of such electrode material shapes may accommodate such size changes, the fixed thin sections, such as wire ends anchored to a metal current collector surface, experience much strain which may break the connection between the active material and the current collector.

In accordance with embodiments of the invention, vulnerable thin sections of electrode material nanometer shapes are grown on, or embedded in a shape memory alloy (SMA) material. This SMA material in the electrode structure is placed and formed so as to accommodate growth and shrinkage of the thin shapes of active electrode material during cell operation, and to prevent them from breaking at critical locations and reducing the energy capacity of the cell. A nickel-titanium alloy, composed of 53 atomic percent titanium, is an example of a shape memory alloy that that displays superelastic properties. Nickel-titanium alloy (sometimes NiTi in this specification) is commercially available. NiTi and like superelastic metal alloys are used in practices of this invention to provide a stress buffer between the base ends of the many negative electrode material nanowires or other material shapes and the metal current collector bodies to which they are anchored. As will be described in more detail, the shape memory alloy buffer material displays large reversible deformation in response to the changing size of the ends of the nanowires and reduces the stress on them.

Masking techniques and material deposition techniques are used to selectively place SMA material on one or both surfaces of a strip of copper current collector to provide a stress-relieving bond between the wire-shapes of electrode material and the current collector. In some cases the SMA material is located at the bonded end of the wire-shapes (which may be embedded in the surface of the current collector), and in other embodiments the SMA material also encloses the active material along some or much of the length of the wire-shape.

In other embodiments, the SMA also serves as the current collector for the nanowire shapes as it carries and supports them for stress relief. Practices are disclosed in this specification for forming suitable bases and shapes of the SMA with nanometer size holes for growth and support of the nanowires of active electrode material.

Other objects and advantages of the invention will be apparent from detailed descriptions of practices for forming the SMA and nanowire structures and arrangements. Reference will be had to illustrative drawing figures which are described in the following section of this specification.

BRIEF DESCRIPTION OF THE DRAWINGS

FIG. 2 also illustrates the metallic current collectors that support the respective electrode materials. FIG. 2 also illustrates a negative electrode with wire-shapes of negative electrode material of this invention Some elements of the cell are shown separated for more clear illustration, but they are actually in compressed face-to-face contact and the electrode materials are formed on, or bonded to, their respective current collectors.

DESCRIPTION OF PREFERRED EMBODIMENTS

Figure 1:
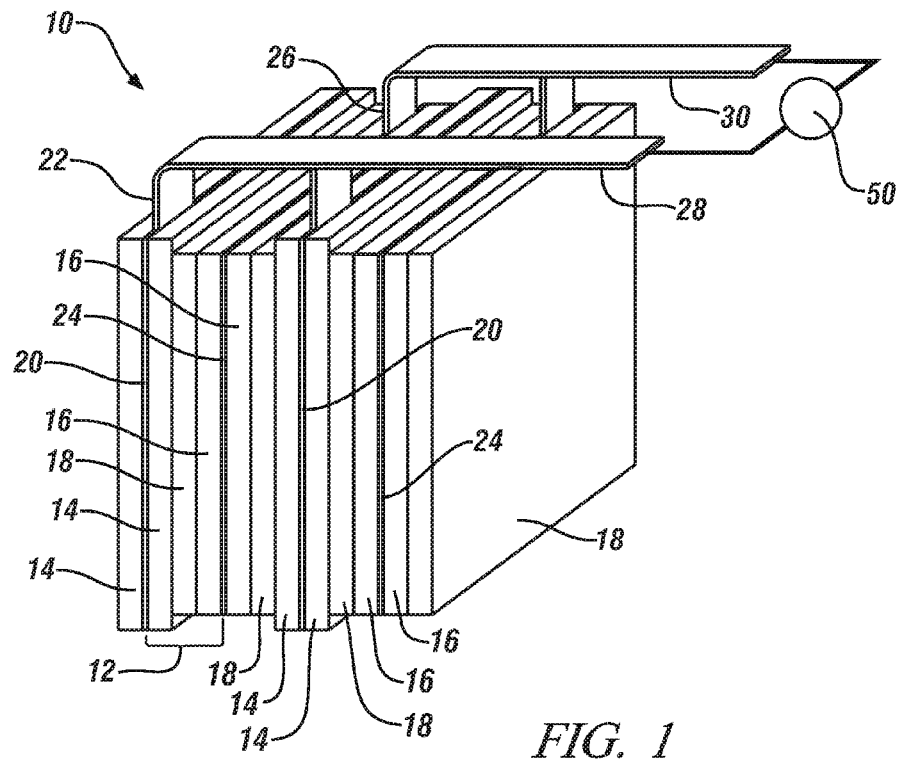
FIG. 1 is an enlarged schematic illustration of a few electrochemical cells of an exemplary lithium ion battery arrangement. Each cell includes a thin, rectangular negative electrode, a like-shaped positive electrode, and a separator sandwiched between the electrodes.

An exemplary and generalized illustration of a lithium-ion battery 10 is depicted in FIG. 1. The lithium-ion battery 10 shown here includes several thin rectangular-shaped electrochemical battery cells 12 that are each bracketed by metallic current collectors. The electrochemical battery cells 12 are stacked side-by-side in a modular configuration and, in this example, connected in parallel. A lithium-ion battery 10 may be formed of many like electrochemical cells in electrical series or in parallel connection to form a lithium ion battery that exhibits the voltage and current capacity demanded for a particular application. It should be understood the lithium ion battery 10 shown here is only a schematic illustration. FIG. 1 is presented to show the relative position and physical interactions of the various components that constitute the electrochemical battery cells 12 (i.e., the electrodes and the separator); it is not intended to inform the relative sizes of the electrochemical battery cells' components, to define the number of electrochemical battery cells 12 in the lithium ion battery 10, or to limit the wide variety of structural configurations the lithium ion battery 10 may assume.

The electrochemical cell 12 (one indicated) contained in the lithium ion battery 10 includes a negative electrode 14 (also referred as negative electrode material), a positive electrode 16 (also referred to a positive electrode material), and the separator 18 situated between the two opposing electrodes 14, 16. Each of the negative electrode 14, the positive electrode 16, and the separator 18 is wetted with a liquid electrolyte solution that enables the transport of lithium ions between the electrodes 14, 16. A negative-electrode metallic current collector 20 (typically, copper) that includes a negative polarity tab 22 is located between the back-to-back negative electrodes 14 of adjacent electrochemical cells 12. Likewise, a positive-side metallic current collector 24 (typically, aluminum) that includes a positive polarity tab 26 is located between neighboring positive electrodes 16. The negative polarity tab 22 is electrically coupled to a negative terminal 28 and the positive polarity tab 26 is electrically coupled to a positive terminal 30. Each electrode material 14, 16 is typically formed on or bonded to its respective metallic current collector 20, 24. An applied compressive force usually presses the metallic current collectors 20, 24 and their electrodes 14, 16 against the separator 18 to achieve intimate interfacial contact between adjacent contacting components. Negative terminal 28 and positive terminal 30 are connected to an electrical power consuming load 50. For example, a suitable battery pack comprising many like individual cells may be provided to power an electric traction motor to drive the wheels in an automotive vehicle. In such a battery pack many cells are connected in groups in electrical parallel arrangement for providing suitable energy capacity and many groups are connected in series to provide a suitable electrical voltage potential.

Figure 2:
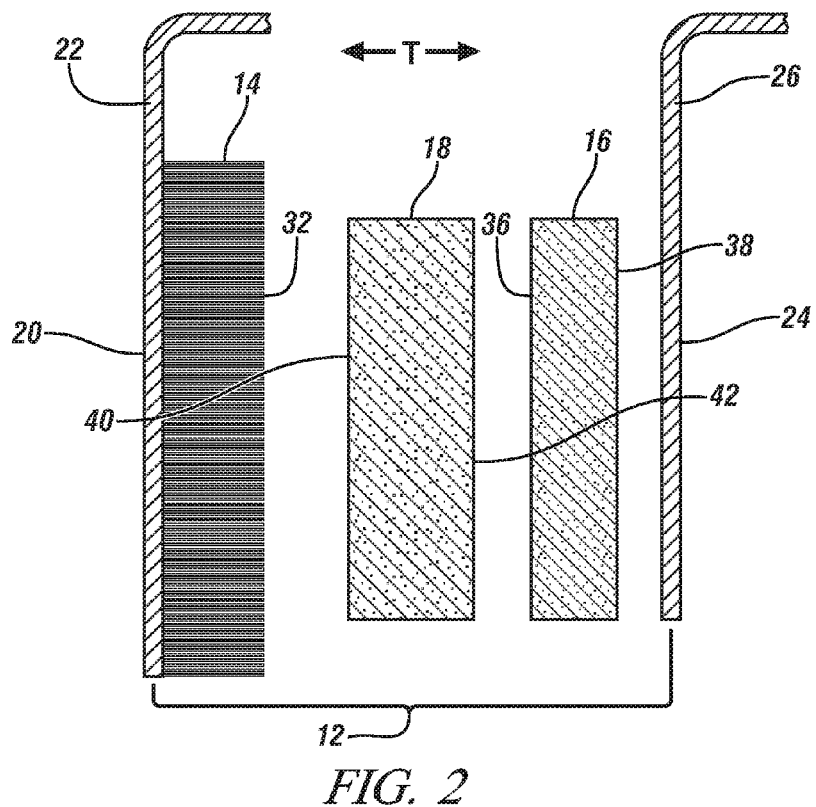
FIG. 2 is a further enlarged and partially-exploded cross-sectional view of one of the electrochemical cells shown in FIG. 1.

A cross-sectional view (partially presented as an exploded view) of the electrochemical battery cell 12 and its associated metallic current collectors 20, 24 is generally illustrated in FIG. 2. In many battery cells, the negative electrode 14 includes a distinguishable inner face surface and an outer face surface relative to the location of the separator 18. In this invention the negative electrode material 14 consists essentially of nanowires or wire-like shapes of silicon, tin, carbon or other suitable material susceptible to lithiation and delithiation. In the embodiment of FIG. 2, the inner ends of nanowires are bonded, using a shape memory alloy to the negative metallic current collector 20. The outer ends of the nanowires making up the negative electrode material present an outer surface or face 32 (outer with respect to the negative electrode current collector).

The positive electrode 16 often includes a distinguishable inner face surface 38 lying against the positive current collector 24 and an outer face surface 38. The negative electrode 14 may, but is not required to, encompass a larger two-dimensional surface area than the corresponding area of the positive electrode 16, as shown. When assembled into the electrochemical battery cell 12, the outer face surfaces 32, 36 of the negative and positive electrodes 14, 16 confront one another and are pressed against a negative-side major face surface 40 and a positive-side major face surface 42 of the separator 18, respectively. Such pressed-engagement occurs generally uniformly along the entire interface of the major face surfaces 40, 42 of the separator 18 and the corresponding portions of the inner face surfaces 32, 36 of the electrodes 14, 16. Both of the metallic current collectors 20, 24 engage their respective electrode materials 14, 16 over an appreciable interfacial surface area to facilitate the efficient collection and conduction of free electrons.

In many lithium-ion batteries the elements of electrochemical cells 12 are made of materials such that they are generally thin and flexible. By way of illustrative example, a typical thickness (T in FIG. 2) of the electrochemical cell 12 including the negative electrode current collector 20, the negative electrode material 12, the separator 18, the positive electrode 16 and its current collector 26 may about 80 µm to about 350 µm. By way of further example, each electrode material 14, 16 may be about 20 µm to 200 µm thick and the separator 18 may be about 10 µm to 50 µm thick. The metallic current collectors 20, 24 are often about 5 µm to 20 µm thick. The relatively thin and flexible nature of the elements of the electrochemical cell 12 and its associated metallic current collectors 20, 24 allows them to be rolled, folded, bent, or otherwise maneuvered into a variety of lithium-ion battery configurations depending on design specifications and spatial constraints. The lithium ion battery 10 may, for example, include a number of distinct electrochemical cells 12 that have been fabricated, cut, aligned, and laid-up next to one another or, in an alternative embodiment, the cells 12 may be derived from a continuous layer that is folded back-and-forth over itself many times.

In accordance with this invention, negative electrode materials for a lithium-ion battery are provided. The negative electrode materials consist essentially of a suitable metallic current collector (such as a copper current collector) to which the ends of many nanowires of active negative electrode material or wire-shapes of negative electrode material are attached using a shape memory metal alloy (preferably a shape memory alloy displaying super elastic properties) in anchoring the attached ends of the nanowires to the current collector. In some embodiments of the invention, the SMA material may also support or confine negative electrode active material along a portion or entirety of the length of wire-shape of the material. And in some embodiments of the invention the shape memory alloy may serve as a major portion of the metal current collector, or all of the current collector material.

In many lithium-ion cells and batteries substantially pure high conductivity copper is used as the current collector because of its stability during discharging and charging of the negative electrode materials of the cell. As stated above, some shape memory metal material is used to anchor the nanowires or wire shapes of active negative electrode material to the copper so that there is an interface of NiTi or the like between the ends of the nanowires and the copper current collector layer of the cell. In some embodiments of the invention, a relatively thin layer of NiTi metal, or like suitable SMA material, may serve as the current collector metal for the nanowires anchored in it.

Before describing methods of forming the SMA material and electrode material constructions of this invention, it will be useful to describe how the SMA materials are employed in the electrode structures of a lithium-ion cell. Super-elastic shape memory alloys (SE-SMAs) possess the ability to reversibly change shape at large strains compared to conventional metallic alloys upon the application and relaxation of an applied stress. These alloys can accommodate such large and reversible strains due to reversible, stress-induced phase transformations. These phase transformations typically involve, but are not limited to the phases: austenite and martensite, with austenite being stable in the low stress state and martensite in the high stress state. Because the phase transformations are stress assisted, the overall stress-strain response is non-linear and discontinuous. At low stresses, the austenite remains stable and obeys a linearly elastic (Hookean) behavior until a critical stress is reached, above which, the austenitic phase begins to transform to martensite. Upon further deformation, the SE alloy continues to transform to martensite and deform at a constant stress until all the austenite has been fully transformed. Once the phase transformation has been completed, stress increases again with strain until the material yields plastically.

The region of constant stress is known as the plateau stress, and corresponds to the beginning and end of the phase transformation. Theoretically, the degree of phase transformation is proportional to the fractional position of strain so that zero percent transformation exists at one end of the stress plateau, and one hundred percent transformation at the other. It is this stress plateau that provides the most significant strain in the elastic-super-elastic stress/strain response, and is responsible for the majority of the reversible transformation strain and, thus, for the recoverable transformation strain back to the material's prescribed shape at low stress.

For the purposes of this specification, one can view the SE alloy as a non-linear stress spring that lies within the active negative electrode of the battery. When the electrode expands due to lithiation, the SE material stretches imposing a reverse stress that is in opposition to that of the active electrode. Upon de-lithiation both the electrode and that SE alloy contract, but with the same reverse stress acting to drive the active electrode material back to its de-lithiated shape and volume.

Following are descriptions of some examples of preferred practices for preparation of nanowire negative electrode materials on metal current collectors in accordance with this invention.

Figure 3A:
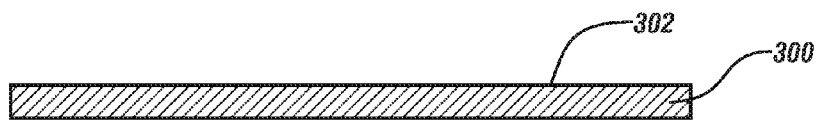
FIGS. 3(a)-3(f) are a series of schematic illustrations in cross-section of progressively formed elements of a negative electrode for describing a method of forming nanowires of negative electrode material on a conventional copper current collector with a layer of NiTi shape memory alloy interposed between the ends of the nanowires and the surface of the copper. Six steps of the process are illustrated, from the top to the bottom of the Figure, starting with the provision of the copper current collector layer.

FIG. 3(a) is an enlarged schematic cross-sectional illustration of a thin sheet of copper current collector material 300 for application of nanowires of negative electrode material where the nanowires are connected to the upper surface 302 of copper sheet 300 by a layer of NiTi super elastic shape memory alloy. The thickness of the copper sheet 300 may, for example, be five to ten or twenty micrometers (μm). In the six successive images of FIG. 3(a) through (f), material layers are formed on the copper sheet 300 and processed to form anchored nanowires of negative electrode material. The illustrations in FIGS. 3(a)-3(f) are presented to illustrate processing steps and are not drawn to dimensional scale. In this and following examples it may be preferred to start with a suitably large sheet of copper for preparation of negative electrode material with the intention of later cutting the prepared material into smaller pieces for assembly into many individual lithium-ion cell packages or arrangements. Practices of the invention will be illustrated by formation of negative electrode active material on one side of a current collector sheet. But it is to be understood that negative electrode material may be applied to both sides of a current collector strip or body.

Figure 3B:
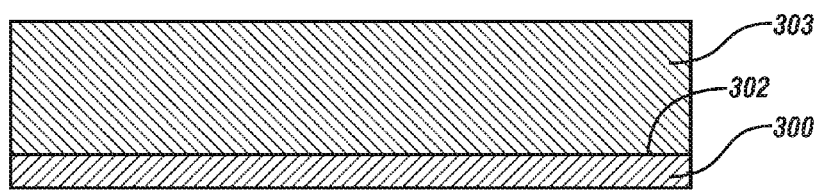

A porous layer of aluminum 303 (FIG. 3(b)) is formed on surface 302 and generally coextensive with the surface of the current collector sheet 300. The aluminum layer 303 is oxidized by anodizing to form a porous layer of alumina 304 in a suitable acidic or alkaline anodizing bath, a commercially available technology. The pores formed in the alumina during anodization of the aluminum are very small; they are nanopores. The thickness of the nanoporous alumina layer 304 will typically be equal to the intended lengths of the nanowires or wire shapes of active material for the negative electrode, for example, often about 20 to 200 μm. Where the current collector is an aluminum sheet, the surface may simply be anodized.

Figure 3C:
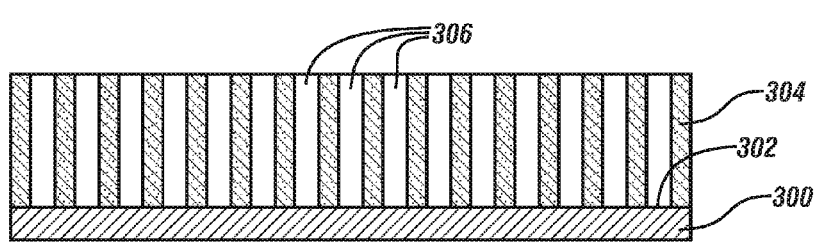

As illustrated in FIG. 3(c), pores 306 with generally straight walls of alumina are formed by the conversion of aluminum to alumina ($Al_2O_3$) during the anodization process by controlling the processing parameters of the anodization step in acidic or alkaline baths in a known manner. These walls when formed to surround or define cylindrical pores 306, fifty to five hundred nanometers in diameter, through the alumina layer at least to the surface 302 of the copper current collector. Although not illustrated in FIG. 3(c), it may be preferred to form pores 306 through the aluminum layer 303 (as it is being anodized to alumina), past the surface 302 and a micrometer or so into the body of the current collector 300. These many pores 306 in alumina layer 304 will serve as templates for the deposition of many bases 308 of SMA for the growth of many nanowires of active negative electrode material. For example, it is suitable to form an alumina template 304 with one million to one trillion pores 306 per square millimeter on the surface 302 of the metal current conductor 300.

There are alternatives to the illustrated practice of depositing and anodizing aluminum to form an alumina layer 304 that has an array of vertical nanopores 306 that form a template for formation of nanowires of negative electrode active material. One alternative is to use electron or light based lithography with a suitable thick polymer film resist in the formation of a template for the formation of nanowires on the current collector surface 302. Another alternative approach in forming a template for SMA bases and nanowires of active material is to use an available anodized nanoporous alumina membrane or to use another available nano-porous membrane such as a track-etched polycarbonate membrane. For example, anodized aluminum membrane templates with a pore size of 20 to 200 nm or polycarbonate templates with like pore size, may be tightly applied to the current collector metal for formation of an SMA base and nanowires of active material. At the completion of nanowire formation using a suitable template (as described in following paragraphs), the template material is removed. For example, an alumina template may be dissolved in 5% to 30% aqueous potassium hydroxide and a polycarbonate template may be dissolved in acetone.

Figure 3D:
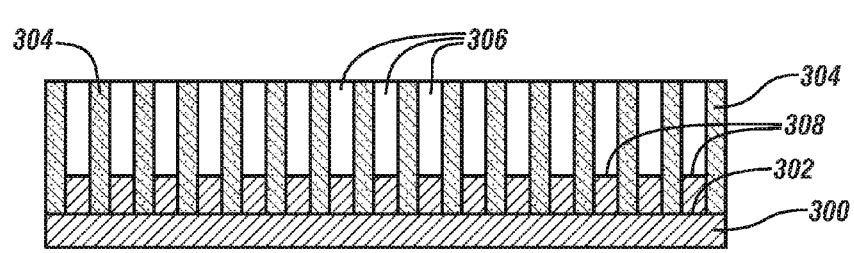

After the etched alumina layer 304 with its pores 306 (or an equivalent template as described above) has been prepared, shape memory alloy, such as super-elastic NiTi, is deposited through each of the template pores 306 in the alumina 304 and onto surface 302 of current collector 300 as SMA bases 308 for the subsequent growth of nanowires of active material. The result is illustrated in FIG. 3(d). The many SMA bases 308 are suitably about one to about ten micrometers in height. The NiTi material or its suitable equivalent may be deposited in template pores 306 by a suitable existing physical vapor deposition process or a chemical vapor deposition process. In this example the SMA bases 308 are deposited to lie on the surface 302 of the copper current collector 300. In other embodiments of the invention, shallow holes may have been etched in surface 302 and the SMA bases 308 will fill such holes (not illustrated in FIGS. 3(a)-3f)) and still extend above surface 302.

Figure 3E:
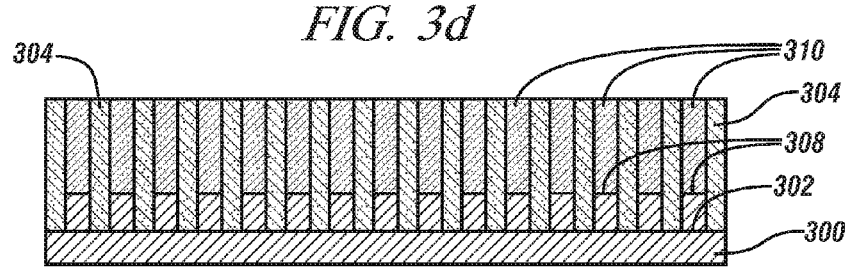

As illustrated in FIG. 3(e), active negative electrode material is then deposited into template holes 306 on the SMA bases 308 to form nanowires 310 of silicon, tin, carbon, or other suitable active material into which lithium may be inserted in the operation of a lithium-ion cell. As stated, the length of the nanowires 310 is often up to about 100 micrometers.

There are known practices for growing nanowires of active negative electrode material in the holes of a suitable template material (such as the nanometer-size holes 306 in the alumina film 304) fixed to a surface 302 of a current collector 300. For example, physical vapor deposition (including magnetron sputtering, cathode arc, e-beam evaporation, or pulsed laser ablation practices) may be used to place a catalyst, if required, in the holes for promoting subsequent growth of a nanowire material. A catalyst deposit of gold and iron, about 2-50 nm thick may be deposited on the SMA bases 308 for growing silicon nanowires. Catalytic amounts of iron, nickel, or cobalt and their alloys may be used for growing carbon nanowires or nanotubes. Then, chemical vapor deposition may be used to grow silicon nanowires, carbon nanofibers, or the like, to lengths of fifty micrometers or so depending on the catalyst deposit.

Figure 3F:
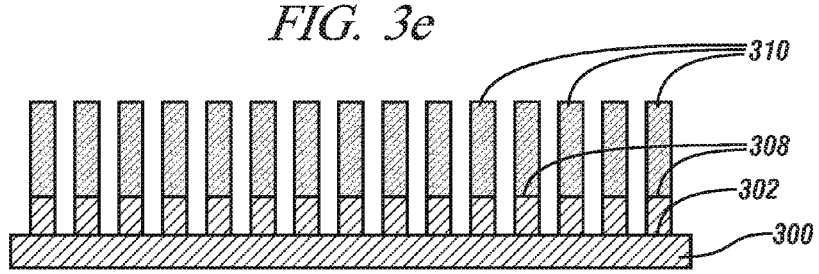

Following formation of nanowires 310, the alumina template material may be removed with a caustic solution, as described above, to leave a negative electrode structure, as illustrated in FIG. 3(f), consisting essentially of a metal current collector 300 with nanowires of active negative electrode material 310 connected to the current collector 300 by SMA bases 308. The SMA supported nanowires of active material are suitably spaced to permit suitable penetration of the nanowires 310 with a suitable lithium-ion containing and transporting liquid electrolyte for operation of a lithium-ion cell. As the nanowire electrode materials repeatedly experience lithiation and de-lithiation, the corresponding expansion and contraction of the nanowires are accommodated by the super-elastic properties of the SMA base material connecting the nanowires to the current collector. The SMA base material deforms sufficiently to permit the expansion and contraction of the nanowires without breakage and separation of the nanowires from the current collector. And the SMA bases permit suitable electron flow between the nanowires and the current collector.

FIG. 4, with its seven illustrative schematic drawings 4(a)-4(g), is now used to describe a second example of utilizing super-elastic SMA material to bond active negative electrode material with nanowire-shaped portions to a current collector in making a negative electrode for a lithium-ion cell and battery. In this example, and referring to FIG. 4(a), a sheet of copper current collector material 400 is coated on one surface 402 (or both surfaces in some embodiments) with a co-extensive layer of NiTi 404 or other suitable SMA material. A coating of aluminum film 405 is formed coextensively over the SMA layer 404 as illustrated in FIG. 4(b). The aluminum film 405 is oxidized by anodization to form a nanoporous alumina layer 406 as illustrated in FIG. 4(c). Many straight vertical walls of alumina are formed by controlling the anodization process in either acidic or alkaline baths. The vertical walls of alumina 406 surround cylindrical nanopores 408 as illustrated in FIG. 4(c). Nanopores 408 extend substantially parallel through the alumina layer to the underlying SMA layer 404 and are aligned generally perpendicular to the SMA layer 404. The total volume of the nanopores 408 will be greater than about five percent and less than about fifty percent of the volume of the alumina layer 406 formed from aluminum.

Figure 4A:
FIGS. 4(a)-4(g) are a series of schematic illustrations in cross-section of progressively-formed elements of a negative electrode for describing another method of forming nanowire-like shapes of negative electrode material on a conventional copper current collector with an interposed layer of NiTi shape memory alloy on the surface of the copper current collector. The SMA material is shaped to confine a mass of particles of negative electrode material in wire-like shapes. Seven steps of the process are illustrated, from the top to the bottom of the Figure, starting with the provision of the copper current collector layer with a layer of NiTi shape memory alloy applied to one surface of the copper layer.
Figure 4B:
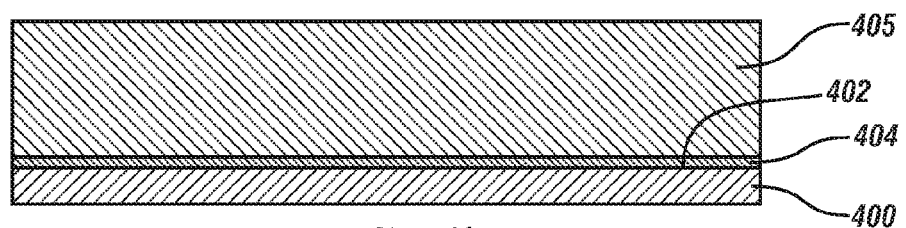
Figure 4C:
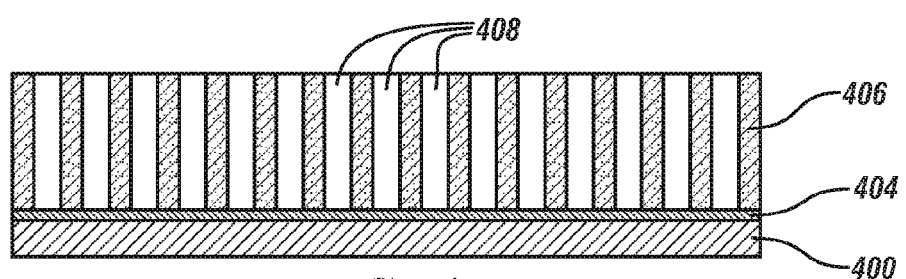
Figure 4D:
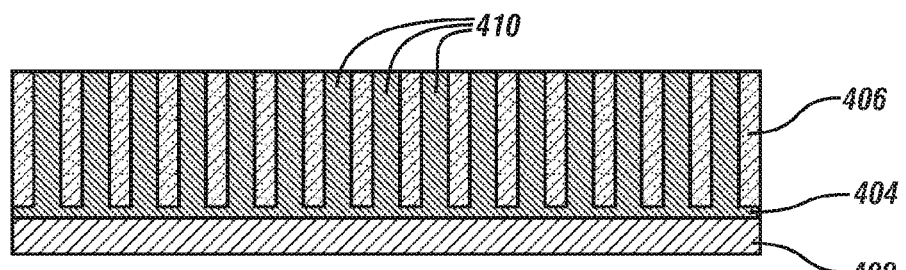
Figure 4E:
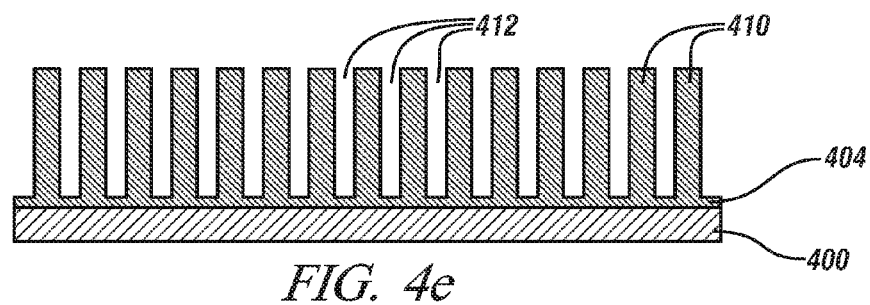

The nanopores 408 in the alumina layer 406 are filled with SMA material by any suitable process such as physical vapor deposition or chemical vapor deposition. This step is illustrated in FIG. 4(d). The remaining alumina material is removed by a suitable caustic etch to leave SMA nanowires 410 that are bonded to and upstanding from the base 404 of SMA material. The result of this processing step is illustrated in FIG. 4(e). The many upstanding, parallel, SMA nanowires 410 are anchored at their lower ends to underlying SMA layer 404 which lies on the upper surface 402 of current collector strip 400. The continuous open space 412 between the many generally round SMA nanowires 410 will now be filled with active material for the negative electrode.

Figure 4F:
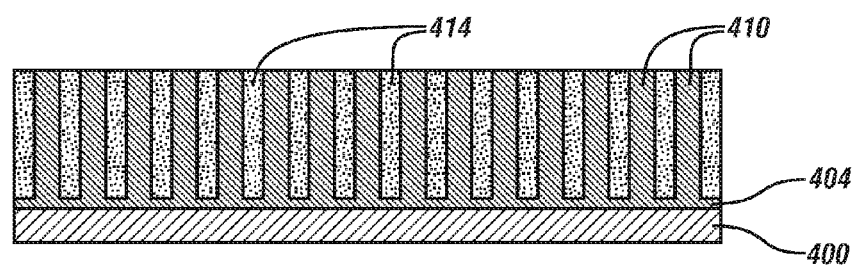

In this example of a practice of the invention, the active material for the negative electrode will be in the form of small particles so as to be placed in the open space 412 of the partially prepared electrode as illustrated in FIG. 4(e). The particles of active material may be, for example, carbon, silicon, tin, or other composition of absorbing and releasing lithium. The particles of active material may be mixed if necessary with particles of a binder (e.g., a polymeric binder), and/or particles of an electrical conductor. The particles of active material may be prepared in the form of a liquid-containing slurry for spin coat loading or other flow process for placing particles of active electrode material into open space 412 between the SMA nanowires 410. The solvent or liquid carrier for the particles is then evaporated form the electrode structure to leave a generally continuous porous body of electrode particles 414 as illustrated in FIG. 4(f). The height of the continuous body of active material and SMA nanowires 410 above the surface 402 of current collector 400 may be, for example, about fifty to one hundred micrometers. The many SMA nanowires serve to anchor the porous body of active material particles 414 and to absorb stresses produced in the body 414 during lithiation and de-lithiation of the active material.

Figure 4G:
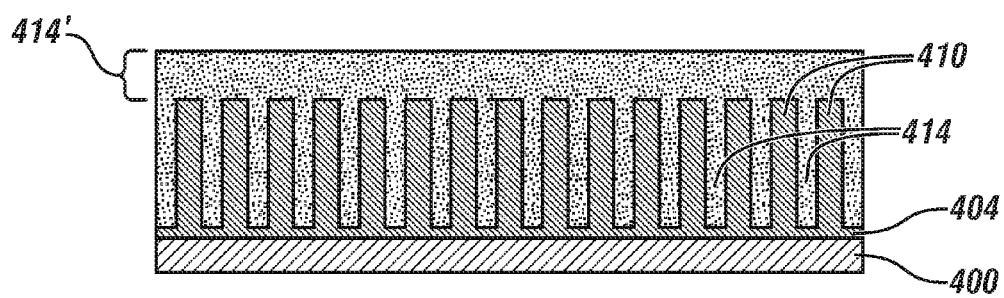

In some embodiments of the invention it may be desired to form an additional layer 414' (a few micrometers in thickness) of the active material over the upper ends of the SMA nanowires 410 and continuous body of active particles 414 (see FIG. 4(g). In the assembled negative electrode structure illustrated in FIG. 4(g), SMA material is the nanowire portion of the structure instead of the active material.

In still other embodiments of the invention, shape memory alloy material may serve as the strip of current collector material to serve as a stress relieving, absorbing anchor layer for nanowires of active material for the negative electrode of lithium-ion electrochemical cells and batteries.

Figure 5A:
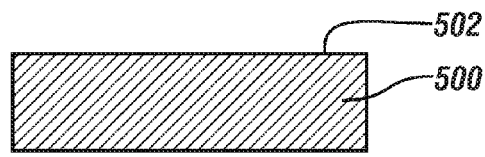
FIGS. 5(a)-5(g) are a series of schematic illustrations in cross-section of progressively-formed elements of a negative electrode for describing another method of forming nanowire-like shapes of negative electrode material on a layer of NiTi shape memory alloy which also serves as the current collector for the applied nanowires.
Figure 5B:
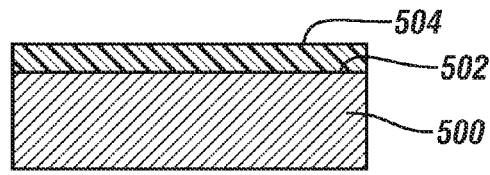
Figure 5C:
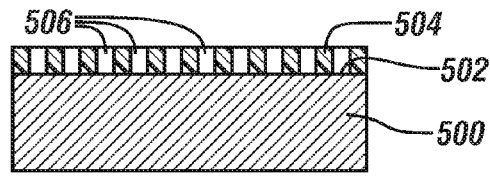
Figure 5D:
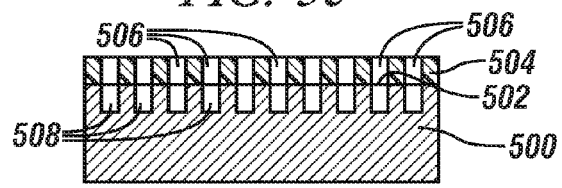

As illustrated in FIG. 5(a), a strip of SMA (e.g., NiTi super-elastic alloy) is formed as a layer 500 having a surface area for the assembly of one or more electrodes. A thin layer of suitable polymeric photo resist material 504 is spin coated or otherwise suitably applied to at least one surface 502 of the SMA current collector strip 500. A suitable mask (not illustrated) is prepared and placed over the photo resist composition. The goal of the masking process is to expose a large number of small round areas in surface 502 for later formation of nanowires or tubes of active material. The surface areas could also be square, triangular, or of other suitable shape. The photo resist layer is exposed to UV radiation through the mask and the undeveloped masking material is removed to leave many, regularly spaced holes 506 (e.g., 2 to 500 nm in diameter) in the masking material 504 overlying surface 502 of the SMA current collector strip 500, FIG. 5(c).

Figure 5E:
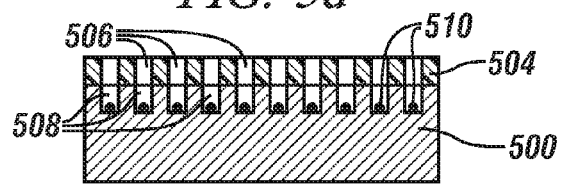
Figure 5F:
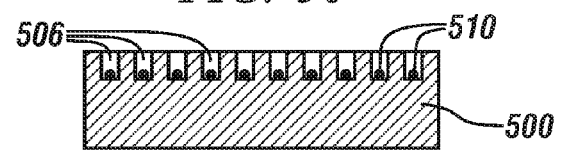
Figure 5G:
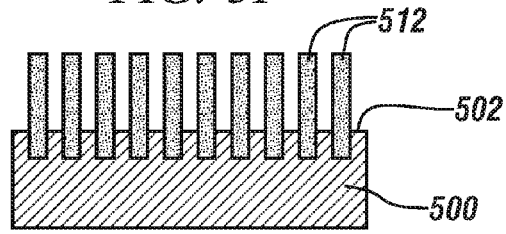

An etchant liquid is used to flood into holes 506 and form a corresponding number of holes or cavities 508 in surface 502 of the SMA current collector strip 500. The etching process is practiced to form holes 508 (after rinsing, etc.) to a depth of about fifty to one hundred nanometers. If necessary for subsequent formation of nanowires of active negative electrode material in holes 508, particles of a suitable catalyst are placed through mask hole 506 into the holes 508 in the SMA layer, as illustrated in FIG. 5(e). The remaining photo resist material is removed, (FIG. 5(f), and nanowires or nanotubes of active negative electrode material 512 are grown in the holes 508 in surface 502 of the SMA current collector strip 500, FIG. 5(g). The total length of the active material nanowires 512 from their anchored ends to their upper ends is usually in the range of about one micrometer to about fifty micrometers. Again, the density of the nanowires of active material is suitably in the range of about a million to a trillion wires per square millimeter. The nanowires are preferably closely and regularly spaced for the infiltration of lithium-containing electrolyte liquid in the assembly and operation of the cell.

A further embodiment of the invention for supporting negative electrode active material on stress relieving SMA current collector material is illustrated in the sequence of schematic, cross-section views of FIGS. 6(a)-6(f). Again, a super-elastic shape memory alloy composition is used as the current collector for the negative electrode of a lithium-ion electrochemical cell. And in this embodiment a procedure using a suitable photo resist polymer coating and masking is employed to provide for the formation of a pattern of SMA supported, spaced-apart, upstanding bodies of negative electrode material on the current collector.

Figure 6A:
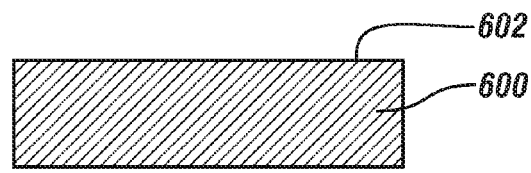
FIGS. 6(a)-6(f) are a series of schematic illustrations in cross-section of progressively formed elements of a negative electrode for describing another method of forming a thin layer of negative electrode material on a layer of NiTi shape memory alloy which also serves as the current collector and provides NiTi supportive posts for the applied active material.
Figure 6B:
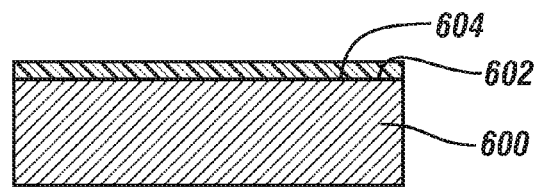
Figure 6C:
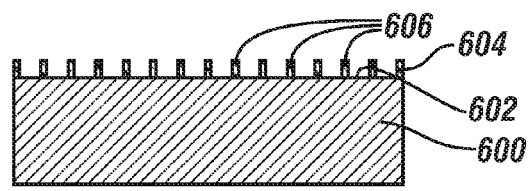

A sheet of SMA current collector 600 having a surface layer 602 is coated with a thin layer of photo resist material 604 as illustrated in FIGS. 6(a) and 6(b). The thickness of the current collector 600 is suitably about five to fifty micrometers and the thickness of the photo resist layer is, for example, about one to five micrometers. The area of the sheet of SMA material 600 may be sized for the formation of a single electrode or for the formation of several electrodes which may be cut from the sheet.

A mask (not illustrated) is used in the exposure of the photo resist with UV frequency light and development and removal of portions of the photo resist to form many regularly and uniformly spaced, round nanowire-like posts 606 in the photo resist layer 604. In a plan view of the structure of FIG. 6(c) the posts of photo resist would be seen as located over the entirety of the boundaries of the surface 602 of SMA current collector sheet 600.

Figure 6D:
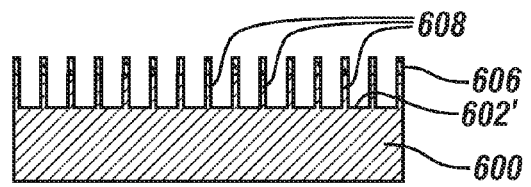
Figure 6E:
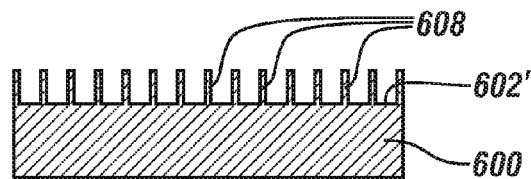

A suitable wet etchant is then applied to the photo resist layer posts 606, the etchant penetrating around photo resist posts 606 to remove an abundance of exposed SMA material from surface 602 to leave shallow posts 608 of SMA material in the etched and lowered surface 602' of SMA current collector sheet 600. As seen in FIG. 6(d), SMA posts 608 extend above etched surface 602' and underlie the photo resist layer posts 606. The liquid etchant is used to form posts 608 to a height (or length) of, for example, one to five micrometers before it is rinsed from the etched current collector 600. The remaining photo resist material 606 is removed from the upper ends of posts 608 of SMA current collector material as illustrated in the cross-section of FIG. 6(e).

Figure 6F:
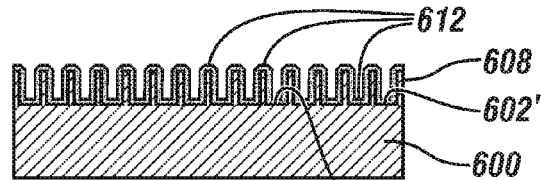

Active negative electrode material, such as silicon, is then deposited as a generally continuous layer 612 on and between SMA posts 608. The layer 612 of negative electrode material may be deposited, for example, by chemical vapor deposition and to a thickness of about 100 nm to about 5 micrometers. As illustrated in FIG. 6(f), the deposited layer of active electrode material 612 covers etched surface 602' of SMA current collector 600 and it's upstanding SMA posts 608. Thus, the deposited layer 612 of silicon, or other suitable active negative electrode material, is carried on stress-relieving, super-elastic SMA material in a configuration of active material 612 that provides continuous and abundant surfaces for lithiation and de-lithiation on upstanding SMA posts 608 and on SMA surface 602' lying between the posts 608.

In the several above illustrated practices of the invention, active negative electrode material is formed in a variety of upstanding shapes that are supported on and connected to a negative electrode current collector. In each of these upstanding shaped bodies of active material, the electrode material is buffered with a super elastic SMA support structure that better enables the active material to experience repeated growth and shrinkage without breaking and separating from the current collector.

The above descriptions of embodiments of the invention are intended to illustrate the invention and not intended to limit the claimed scope of the invention.

The invention claimed is:

1. A lithium-ion electrochemical cell comprising a negative electrode comprising a current collector carrying a negative electrode active material; a positive electrode comprising a current collector carrying a positive electrode active material; a liquid electrolyte containing lithium ions, the liquid electrolyte contacting both electrode materials and providing transport of lithium ions between the negative electrode active material and positive electrode active material; and a separator preventing electrical contact between the positive and negative electrodes while providing transport of lithium ions between the electrode materials; the negative electrode active material and positive electrode active material being formed of different compositions with each electrode active material composition being subject to lithiation and de-lithiation during discharge and charge cycling of the electrochemical cell; at least one of the negative electrode and positive electrode further comprising:
 a metallic current collector sheet having opposing sheet surfaces and being formed of a metal composition that is not subject to lithiation, or volume change due to lithiation, in the cycling of the electrochemical cell;
 electrode active material formed on at least one of the current collector sheet surfaces; the electrode active material being formed as nanosized bodies that extend outwardly from the sheet surface a distance of at least one micrometer, with each body being in electrical contact with the current collector sheet and having a cross-sectional thickness less than five hundred nanometers, the bodies of electrode active material experiencing repeated volume changes during lithiation and de-lithiation of cell cycling; and
 a body of an elastic shape memory alloy formed against at least one portion of each body of the electrode active material.

2. A lithium-ion electrochemical cell as recited in claim 1 in which the shape memory alloy is NiTi.

3. A lithium-ion electrochemical cell as recited in claim 1 in which the shape memory alloy also serves as a current collector for the electrode material.

4. A lithium-ion electrochemical cell as recited in claim 1 in which the negative electrode active material comprises at least one element selected from the group consisting of silicon, tin, and graphite.

5. A lithium-ion electrochemical cell as recited in claim 1 in which the negative electrode active material comprises at least one element selected from the group consisting of silicon, tin, and graphite, the metallic current collector is high conductivity copper, and the shape memory alloy is NiTi.

6. A lithium-ion electrochemical cell comprising a negative electrode comprising a current collector carrying a negative electrode active material; a positive electrode comprising a current collector carrying a positive electrode active material; a liquid electrolyte containing lithium ions, the liquid electrolyte contacting both electrode active materials and providing transport of lithium ions between the negative electrode active material and positive electrode active material; and a separator preventing electrical contact between the positive and negative electrodes while providing transport of lithium ions between the electrode materials; the negative electrode active material and positive electrode active material being formed of different compositions with each electrode material composition being subject to lithiation and de-lithiation during discharge and charge cycling of the electrochemical cell; the negative electrode further comprising:

a metallic current collector sheet having opposing sheet surfaces and a thickness up to about thirty micrometers, the current collector sheet being formed of a metal composition that is not subject to lithiation, or volume change due to lithiation, in the cycling of the electrochemical cell;

negative electrode active material formed on at least one of the current collector sheet surfaces; the negative electrode active material being formed as nanosized bodies that extend outwardly from the sheet surface a distance of at least one micrometer with each body being in electrical contact with the current collector sheet and having a cross-sectional thickness less than five hundred nanometers, the bodies of electrode active material experiencing repeated volume changes during lithiation and de-lithiation of cell cycling; and a body of an elastic shape memory alloy formed against at least one portion of each body of the electrode active material.

7. A lithium-ion electrochemical cell as recited in claim 6 in which the shape memory alloy is NiTi.

8. A lithium-ion electrochemical cell as recited in claim 6 in which the shape memory alloy also serves as a current collector for the electrode active material.

9. A lithium-ion electrochemical cell as recited in claim 6 in which the negative electrode active material comprises at least one element selected from the group consisting of silicon, tin, and graphite.

10. A lithium-ion electrochemical cell as recited in claim 6 in which the negative electrode active material comprises at least one element selected from the group consisting of silicon, tin, and graphite, the metallic current collector is high conductivity copper, and the shape memory alloy is NiTi.

11. A lithium-ion electrochemical cell as recited in claim 6 in which the negative electrode active material is formed as nanowires each attached at an end to a base of shape memory alloy which in turn is formed on a surface of the metal current collector sheet.

12. A lithium-ion electrochemical cell as recited in claim 11 in which the negative electrode active material consists of about one million to about one trillion nanowires per square millimeter of metal current collector sheet and the lengths of the nanowires extends to a height up to about 100 micrometers from the surface of the current collector sheet.

13. A lithium-ion electrochemical cell as recited in claim 6 in which the negative electrode active material is formed as nanowires attached at their ends to a layer of shape memory alloy which also is the metallic current collector sheet.

14. A lithium-ion electrochemical cell as recited in claim 13 in which the negative electrode active material consists of about one million to about one trillion nanowires per square millimeter of metal current collector sheet and the lengths of the nanowires extends to a height up to about 100 micrometers from the surface of the current collector sheet.

15. A lithium-ion electrochemical cell as recited in claim 6 in which a base layer of shape memory alloy is deposited on a surface of the metal collector sheet with an array of spaced nanoposts of shape memory alloy extending to uniform heights from the base layer and particles of negative electrode active material filling the space on the base layer of shape memory alloy and between the spaced nanoposts of shape memory alloy.

16. A lithium-ion electrochemical cell as recited in claim 15 in which height of the array of spaced nanoposts of shape memory alloy is up to about one hundred micrometers.

17. A lithium-ion electrochemical cell as recited in claim 6 in which a sheet of shape memory alloy is the negative electrode current collector and at least one surface of the shape memory alloy sheet carries an array of spaced nanoposts of shape memory alloy extending to uniform heights from the base layer and a continuous film of negative electrode active material is deposited over, around, and between each nanopost and on the surface of the shape memory alloy sheet.

18. A lithium-ion electrochemical cell as recited in claim 17 in which the height of the nanoposts is up to about ten micrometers and the thickness of the film of negative electrode active material is up to about fifty micrometers.

* * * * *